US012764173B2

(12) United States Patent
Wu et al.

(10) Patent No.: US 12,764,173 B2
(45) Date of Patent: Oct. 13, 2026

(54) AUTO-DISCOVER DEPOT SERVICE FOR MULTI-CLOUD

(71) Applicant: Dell Products L.P., Round Rock, TX (US)

(72) Inventors: Xiaojun Wu, Shanghai (CN); Haijun Zhong, Shanghai (CN); Donald Mace, Mashpee, MA (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/947,374

(22) Filed: Nov. 14, 2024

(65) Prior Publication Data

US 2026/0113367 A1 Apr. 23, 2026

(30) Foreign Application Priority Data

Oct. 21, 2024 (CN) ........................ 202411471508.X

(51) Int. Cl.
*H04L 65/611* (2022.01)
*H04L 69/18* (2022.01)

(52) U.S. Cl.
CPC ............ *H04L 65/611* (2022.05); *H04L 69/18* (2013.01)

(58) Field of Classification Search
CPC ............................... H04L 65/611; H04L 69/18
See application file for complete search history.

(56) References Cited

U.S. PATENT DOCUMENTS 10,098,164 B2 * 10/2018 Lewis ................. H04W 12/009
11,757,713 B1 * 9/2023 Jiang ....................... H04L 41/12
2011/0010463 A1 * 1/2011 Christenson ........ H04L 61/5076 709/245
2015/0125124 A1 * 5/2015 Dozier ................... H04N 5/772 386/223
2017/0264666 A1 * 9/2017 Lee ......................... H04L 67/02
2018/0213349 A1 * 7/2018 Panje .................... H04L 12/283
2019/0089693 A1 * 3/2019 Ding ....................... G06F 21/44
2021/0028987 A1 * 1/2021 Krivenok ............ H04L 67/1097
2023/0056166 A1 * 2/2023 Linsky .................... H04W 4/06
2025/0279908 A1 * 9/2025 Goyal ................... H04L 65/611
2025/0310276 A1 * 10/2025 Chandrasekaran ..... H04L 47/12

FOREIGN PATENT DOCUMENTS

CN 104935564 A * 9/2015

* cited by examiner

*Primary Examiner* — Richard G Keehn
(74) *Attorney, Agent, or Firm* — Jackson Walker L.L.P.

(57) ABSTRACT

An information handling system may include at least one processor and a memory. The information handling system may be configured to: implement a depot service configured to provide provisioning payloads to other information handling systems over a network; and transmit multicast domain name service (mDNS) broadcasts via the network to provide an internet protocol (IP) address of the depot service to the other information handling systems.

18 Claims, 2 Drawing Sheets

AUTO-DISCOVER DEPOT SERVICE FOR MULTI-CLOUD

TECHNICAL FIELD

The present disclosure relates in general to information handling systems, and more particularly to an auto-discoverable depot service for serving multi-cloud payloads for provisioning information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In a multi-cloud embodiment, an on-premises HCI system may be able to interface with more than one cloud platform. For example, a cloud platform manager may be used to install a particular cloud OS onto an HCI cluster to prepare it for use with a particular cloud platform (e.g., Amazon® AWS, Microsoft® Azure, Google® Cloud Platform, etc.).

When an HCI node or cluster is being provisioned (or re-provisioned with upgraded packages), a local repository may be used to serve the provisioning payloads. For example, the payloads may include operating system images, driver update bundles, firmware update bundles, application binaries, etc. However, setting up a new depot service for each cloud stack takes significant effort in a multi-cloud environment. A datacenter may already have a depot service set up for one cloud stack but need to create, configure, and maintain a new one for each new cloud stack that must be supported.

Embodiments of this disclosure provide a depot service that implements auto-discovery functionality, which may be based on the multicast domain name system (mDNS) protocol. mDNS provides the ability to perform DNS-like operations on the link-local network in the absence of a conventional unicast DNS server. The service registry and query protocol for the depot service may be defined based on the mDNS protocol.

With this auto-discover depot service, the multi-cloud stack provisioning and upgrading can be performed in a "zero-touch" manner without requiring extra configuration by on-site administrators.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with multi-cloud provisioning of information handling systems may be reduced or eliminated.

In accordance with embodiments of the present disclosure, an information handling system may include at least one processor and a memory. The information handling system may be configured to: implement a depot service configured to provide provisioning payloads to other information handling systems over a network; and transmit multicast domain name service (mDNS) broadcasts via the network to provide an internet protocol (IP) address of the depot service to the other information handling systems.

In accordance with these and other embodiments of the present disclosure, a method may include an information handling system implementing a depot service configured to provide provisioning payloads to other information handling systems over a network; and the information handling system transmitting multicast domain name service (mDNS) broadcasts via the network to provide an internet protocol (IP) address of the depot service to the other information handling systems.

In accordance with these and other embodiments of the present disclosure, an article of manufacture may include a non-transitory, computer-readable medium having computer-executable instructions thereon that are executable by an information handling system for: implementing a depot service configured to provide provisioning payloads to other information handling systems over a network; and transmitting multicast domain name service (mDNS) broadcasts via the network to provide an internet protocol (IP) address of the depot service to the other information handling systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
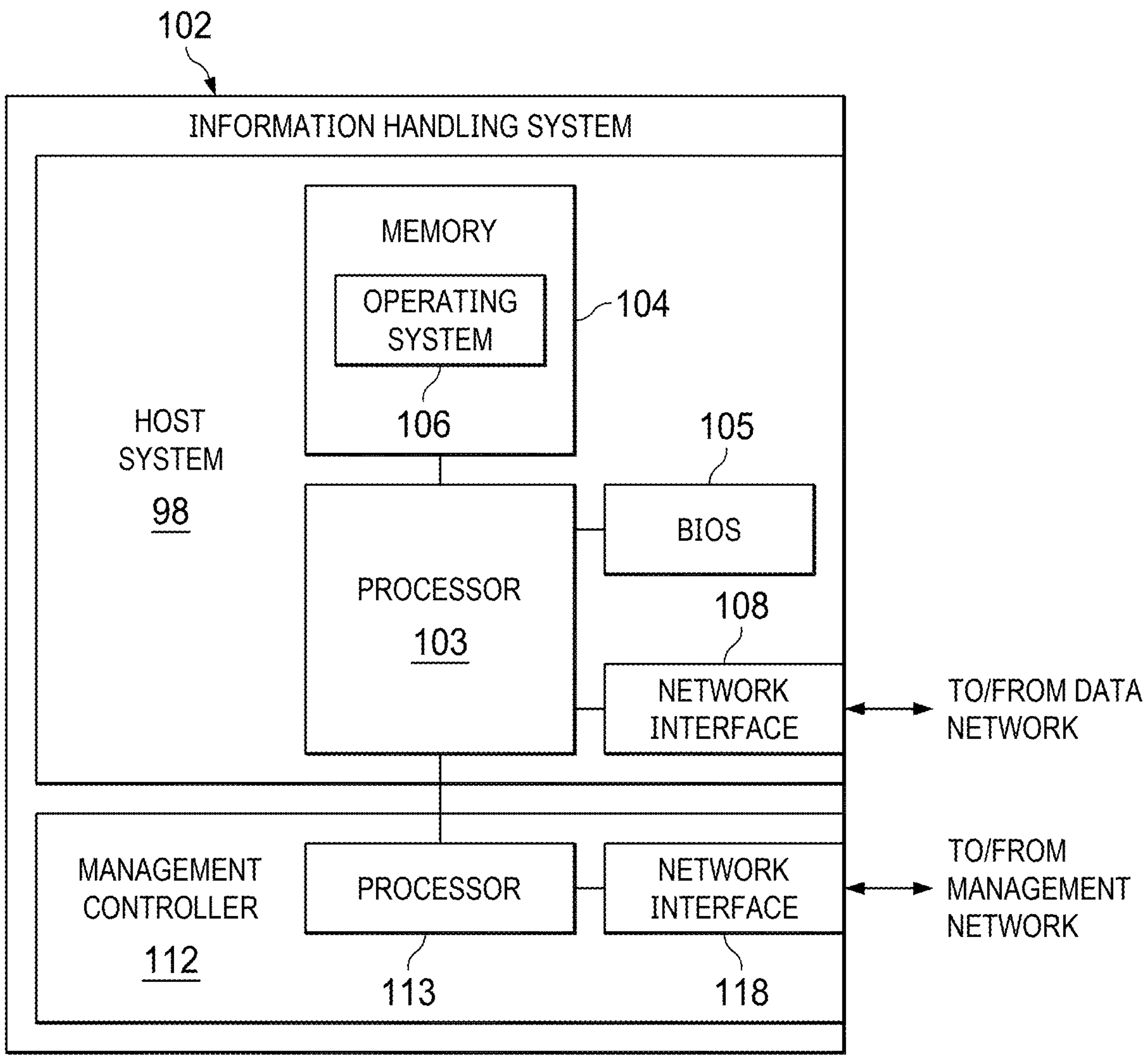
FIG. 1 illustrates a block diagram of an example information handling system, in accordance with embodiments of the present disclosure.
Figure 2:
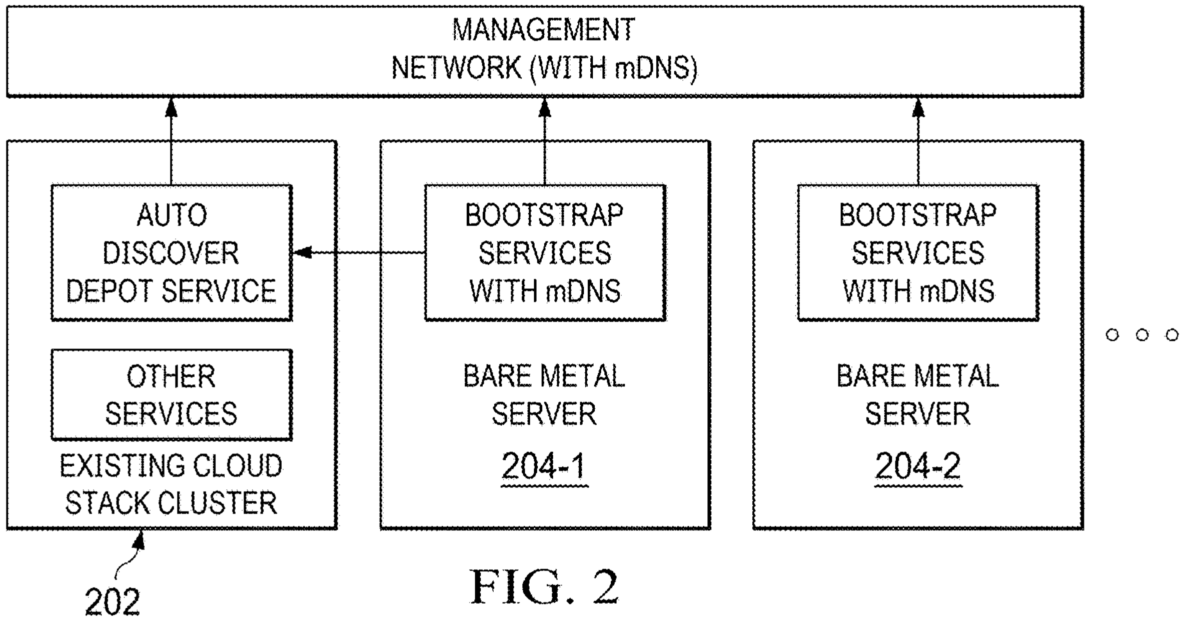
FIG. 2 illustrates an example architecture, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may implement an mDNS-based depot service for serving payloads to provision other information handling systems in a multi-cloud environment. The depot service may be implemented as a cloud-native service which supports different protocols (e.g., HTTP, HTTPS, FTP, Container Image Registry, etc.) for downloading of payloads and metadata.

The depot service may be connected to the management network in some embodiments, and it may broadcast its domain name (e.g., a local name such as "depotservice.local", or with a predefined pattern such as "<prefix>_depot.local"), along with its IP address. Any other services on the management network may listen for the mDNS broadcast packets, store a record of the depot service, and interface with the depot service when needed.

This embodiment in which the out-of-band management network is leveraged may reduce the network impact by separating this workflow from the data network, so that the mDNS broadcasts will not impact the business network. In other embodiments, however, the standard data network may be used instead of the out-of-band management network.

Turning now to FIG. 2, an example architecture is shown. As shown, the auto-discovery depot service may be deployed in a datacenter by running on an existing cloud stack cluster 202 (e.g., within a VM on an existing HCI cluster).

When a new bare metal server 204 is powered up and connected to the management network, a bootstrap service included in its initial provisioning from the factory may query the management network for the depot service's domain name pattern with the mDNS protocol to get the IP address of the depot service.

Once the IP address of the depot service has been determined, the bootstrap service may contact the depot service directly to download the necessary metadata and payload data in order to provision the new bare metal server.

Thus embodiments allow for a new bare metal server to be provisioned to the desired cloud stack in a "zero-touch" fashion without intervention from support staff, because the depot service can be discovered automatically.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor; and a memory;

wherein the information handling system is configured to:

implement a depot service configured to provide provisioning payloads to other information handling systems over a network; and transmit multicast domain name service (mDNS) broadcasts via the network to provide an internet protocol (IP) address of the depot service to the other information handling systems.

2. The information handling system of claim 1, wherein the information handling system is a hyper-converged infrastructure (HCI) cluster.

3. The information handling system of claim 1, wherein the network is an out-of-band management network.

4. The information handling system of claim 1, wherein the provisioning payloads include payloads for initial setup of new other information handling systems.

5. The information handling system of claim 1, wherein the provisioning payloads include payloads for upgrading components of existing other information handling systems.

6. The information handling system of claim 1, wherein the provisioning payloads include cloud payloads for a plurality of cloud systems.

7. A method comprising:

an information handling system implementing a depot service configured to provide provisioning payloads to other information handling systems over a network; and the information handling system transmitting multicast domain name service (mDNS) broadcasts via the network to provide an internet protocol (IP) address of the depot service to the other information handling systems.

8. The method of claim 7, wherein the information handling system is a hyper-converged infrastructure (HCI) cluster.

9. The method of claim 7, wherein the network is an out-of-band management network.

10. The method of claim 7, wherein the provisioning payloads include payloads for initial setup of new other information handling systems.

11. The method of claim 7, wherein the provisioning payloads include payloads for upgrading components of existing other information handling systems.

12. The method of claim 7, wherein the provisioning payloads include cloud payloads for a plurality of cloud systems.

13. An article of manufacture comprising a non-transitory, computer-readable medium having computer-executable instructions thereon that are executable by an information handling system for:

implementing a depot service configured to provide provisioning payloads to other information handling systems over a network; and transmitting multicast domain name service (mDNS) broadcasts via the network to provide an internet protocol (IP) address of the depot service to the other information handling systems.

14. The article of manufacture of claim 13, wherein the information handling system is a hyper-converged infrastructure (HCI) cluster.

15. The article of manufacture of claim 13, wherein the network is an out-of-band management network.

16. The article of manufacture of claim 13, wherein the provisioning payloads include payloads for initial setup of new other information handling systems.

17. The article of manufacture of claim 13, wherein the provisioning payloads include payloads for upgrading components of existing other information handling systems.

18. The article of manufacture of claim 13, wherein the provisioning payloads include cloud payloads for a plurality of cloud systems.

* * * * *